United States Patent [19]

Ikeda et al.

[11] Patent Number: 5,386,730
[45] Date of Patent: Feb. 7, 1995

[54] PRESSURE SENSOR HAVING A SEALED WATER-RESISTANT CONSTRUCTION

[75] Inventors: Kazuhisa Ikeda, Chiryu; Minoru Tokuhara, Okazaki; Hironobu Baba, Anjo, all of Japan

[73] Assignee: Nippondenso Co., Ltd., Kariya, Japan

[21] Appl. No.: 80,216

[22] Filed: Jun. 23, 1993

[30] Foreign Application Priority Data

Jun. 25, 1992 [JP] Japan ................................. 4-050548
Jul. 10, 1992 [JP] Japan ................................. 4-048493

[51] Int. Cl.⁶ ............................................... G01L 7/00
[52] U.S. Cl. ........................................ 73/706; 73/756
[58] Field of Search ................. 73/706, 723, 724, 725, 73/726, 727, 728, 729, 753, 754, 756, 431

[56] References Cited

U.S. PATENT DOCUMENTS

| | | | |
|---|---|---|---|
| 4,413,527 | 11/1983 | Sugiura et al. | 73/754 |
| 4,500,864 | 2/1985 | Nakane et al. | 73/726 |
| 4,516,430 | 5/1985 | Kurtz et al. | 73/727 |
| 4,554,927 | 11/1985 | Fussell | 73/727 |
| 4,770,045 | 9/1988 | Nakagawa et al. | 73/726 |
| 4,829,827 | 5/1989 | Wareham | 73/706 |

FOREIGN PATENT DOCUMENTS 63-052029 3/1988 Japan .
63-296283 12/1988 Japan .

Primary Examiner—Richard E. Chilcot, Jr.
Assistant Examiner—William L. Oen
Attorney, Agent, or Firm—Cushman, Darby & Cushman

[57] ABSTRACT

A pressure sensor has a housing (1). The housing accommodates a pressure sensing element (2) and a wiring board (3). The wiring board incorporates a lead irame (14). The lead frame connects output terminals (21) of the sensing element with ends of connector pins (12). A pressure guide (4) has a pressure path (41) and a flange (44). The flange is inserted in an opening of the housing with the pressure path being airtightly connected to a pressure intake (22) extending from the sensing element and with an end face (4a) of the flange being spaced apart from the wiring board. Potting material (5) coats the sensing element, the wiring board, and the flange of the pressure guide in the housing. If the potting material peels off the flange, water may penetrate the peeled part and reach the end face of the flange. The water, however, never reaches the wiring board because the end face of the flange is spaced apart from the wiring board. Accordingly, the lead frame in the wiring board is free from water and no migration is caused.

16 Claims, 5 Drawing Sheets

PRESSURE SENSOR HAVING A SEALED WATER-RESISTANT CONSTRUCTION

BACKGROUND OF THE INVENTION

1. Field of the Invention

The present invention relates to a pressure sensor, and in particular, to a pressure sensor having a sensing element, a pressure guide communicating with a pressure intake extending from the sensing element, a housing accommodating the sensing element and an end of the pressure guide, and potting material such as resin filled in the housing to shield the sensing element and pressure guide. The present invention also relates to a pressure sensor structure that effectively prevents penetration of water.

2. Description of the Related Art

FIG. 1 shows an example of a conventional pressure sensor.

The pressure sensor has a housing 1 made of resin. The housing 1 has a lower opening 13. A thick side-wall of the housing 1 forms a connector 11. Connector pins 12 (only one is shown) are embedded through the connector 11. The housing 1 accommodates a pressure sensing element 2 incorporating a known semiconductor sensor. The sensing element 2 has a lower metal case 23 having a collar. The collar is positioned against a step formed on the inner wall of the housing 1, to set the sensing element 2 in the housing 1. A given space is defined around the sensing element 2 in the housing 1.

A pipe like pressure guide 4 has an internal pressure path 41. An end of the pressure guide 4 is inserted in the opening 13 of the housing 1 such that a top opening of the pressure path 41 airtightly engages with a pressure intake 22 that extends from the center of the bottom of the metal case 23 of the sensing element 2.

The pressure guide 4 has a flange 42 having a given thickness. The flange 42 covers the opening 13 of the housing 1. A metal lead frame 14 is embedded in the flange 42. The flange 42 has notches and holes to expose the lead frame 14. The exposed spots of the lead frame 14 are connected to the inner ends of given ones of the connector pins 12 and given output terminals 21 protruding from the metal case 23, to thereby electrically connect the connector pins 12 with the output terminals 21.

A chip capacitor 24 for absorbing ignition noise is connected to the lead frame 14 at a proper position. A through capacitor 25 for absorbing electromagnetic noise is arranged around each of the output terminals 21.

Potting material 5 such as resin is injected in spaces in the housing 1, to cover and protect the sensing element 2 and the flange 42 of the pressure guide 4.

Coefficients of thermal expansion of the potting material 5, housing 1, and pipe 4 usually differ from one another. When the pressure sensor is used for a long time in, for example, an engine compartment in which ambient temperatures drastically change, the potting material 5 may peel off the pressure guide 4 at contact A in particular. Then, water will penetrate the contact A and reach a junction between the lead frame 14 and the chip capacitor 24. This causes Ag paste to migrate, thereby short-circuiting the output terminals 21 and deteriorating the sensor output.

SUMMARY OF THE INVENTION

To solve this problem, an object of the present invention is to provide a pressure sensor that prevents penetration of water to a sensing element even if potting material peels.

In order to accomplish the object, a pressure sensor according to the present invention basically employs a housing having an opening; a pressure sensing element disposed in the housing and having a protruding pressure intake; a pressure guide having a pressure path and a flange, the flange being inserted in the opening of the housing with the pressure path being airtightly connected to the intake of the sensing element; and potting material such as resin injected in the housing. The sensing element is spaced apart from the flange of the pressure guide, to form a clearance therebetween. The clearance is filled with the potting material.

DESCRIPTION OF THE PREFERRED EMBODIMENTS

Pressure sensors according to embodiments of the present invention will be explained with reference to the drawings.

Figure 1:
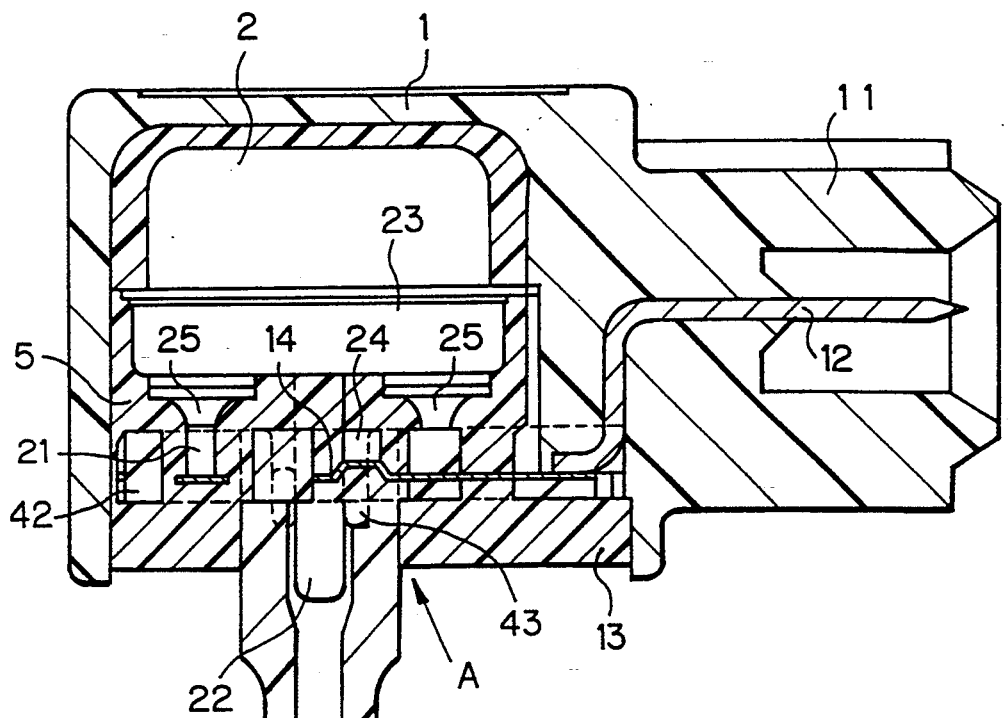
FIG. 1 is a section showing a pressure sensor according to a prior art.
Figure 2:
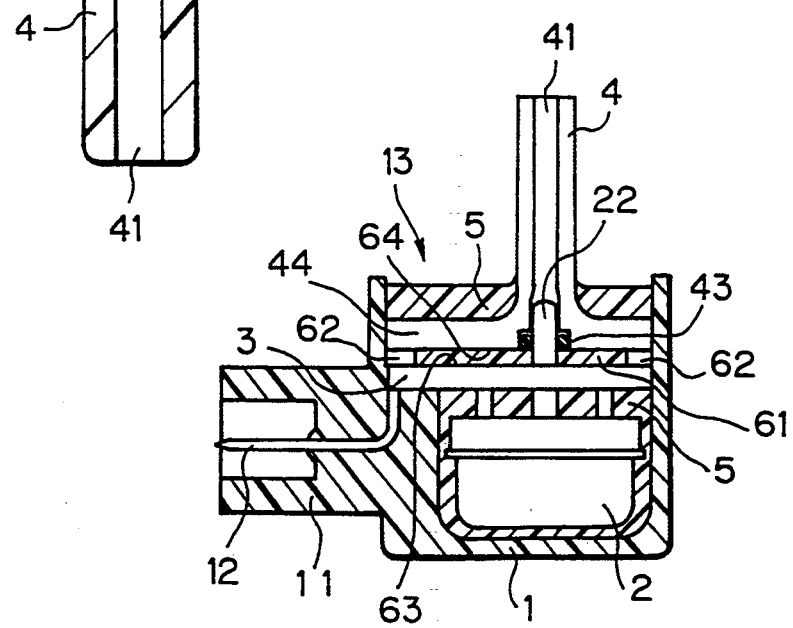
FIG. 2 is a section showing a basic arrangement of a pressure sensor according to the present invention.

FIG. 2 shows a basic arrangement of a pressure sensor according to the present invention.

The pressure sensor has a housing 1 having an opening 13. The housing 1 accommodates a pressure sensing element 2 having a protruding pressure intake 22. A pressure guide 4 has a pressure path 41 and a flange 44. The flange 44 is airtightly fitted to the opening 13 with the pressure path 41 being airtightly connected to the intake 22. Potting material 5 such as resin is injected in the housing 1. The sensing element 2 is spaced apart from the flange 44, to form a clearance 61 therebetween. The clearance 61 is filled with the potting material 5.

The potting material 5 may peel off the housing 1 or the pressure guide 4 due to differences in coefficients of thermal expansion thereof. If this happens, water may penetrate the peeled part. Accordingly, the present invention separates the sensing element 2 from the pressure guide 4.

The housing 1 is made of resin. A thick side-wall of the housing 1 forms a connector 11. The connector 11 has embedded connector pins 12 (only one is shown) that pass through the connector 11.

The sensing element 2 incorporates a known semiconductor sensor.

A wiring board 3 is made of resin and has a predetermined thickness. The board 3 is located above the sensing element 2 in the opening 13 of the housing 1. A lead frame (not shown) is embedded in the board 3. The board 3 has notches and holes to expose the lead frame. The exposed spots of the lead frame are connected to the inner ends of given ones of the connector pins 12 and to given output terminals protruding from a metal case of the sensing element 2, to thereby electrically connect the connector pins 12 to the output terminals.

The flange 44 of the pressure guide 4 is disposed above the wiring board 3 in the opening 13 of the housing 1. The periphery of the flange 44 is close to. the inner wall of the opening 13. The intake 22 protruding from the sensing element 2 passes through the wiring board 3 and airtightly engages with the pressure path 41 of the pressure guide 4 through an O-ring 43. This arrangement surely guides external pressure through the pressure path 41 up to the semiconductor pressure sensor disposed in the sensing element 2, which detects the pressure.

The potting material 5 seals and protects the sensing element 2, wiring board 3, the flange 44 of the pressure guide 4, and O-ring 43.

To secure the clearance 61, spacers 62 may be arranged on one of the opposing faces of the sensing element 2 and flange 44.

Figure 3:
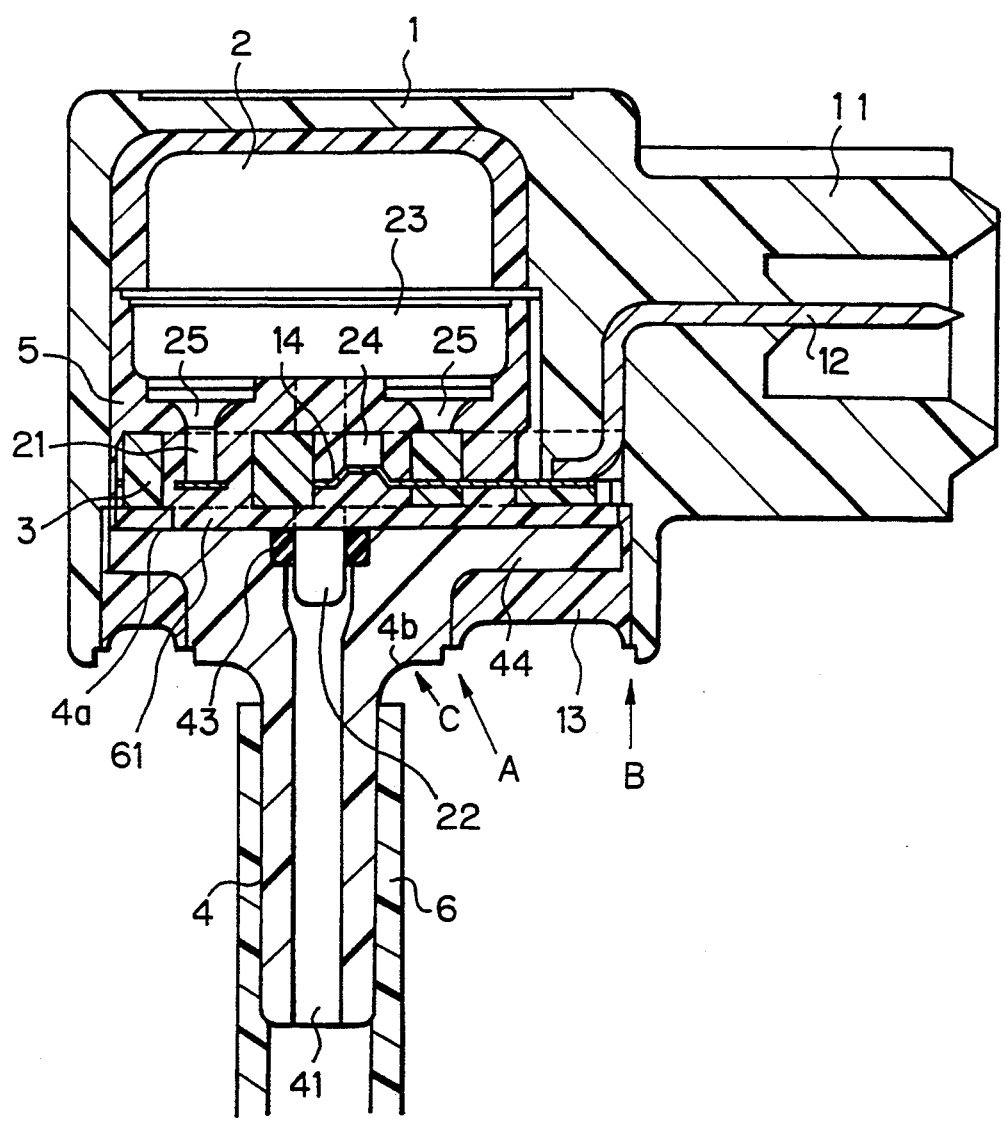
FIG. 3 is a section showing a pressure sensor according to an embodiment of the present invention.

FIG. 3 shows a pressure sensor according to an embodiment of the present invention.

The pressure sensor has a housing 1 having a side wall 11 and an opening 13. The side wall 11 serves as a connector having connector pins 12. The opening receives a wiring board 3 having a lead frame 14. Through the lead frame 14, given output terminals 21 of the sensing element 2 are electrically connected to ends of given ones of the connector pins 12.

The pressure sensor also has a pressure guide 4 having a pressure path 41 and a flange 44. The flange 44 is inserted in the opening 13 of the housing 1. The pressure path 41 is airtightly connected to a pressure intake 22 protruding from the sensing element 2. The intake 22 extends through the wiring board 3. The board 3 is spaced apart from an end face 4a of the flange to form a clearance 61 between them.

Potting material 5 such as resin fills spaces around the sensing element 2, the wiring board 3, and the flange 44 of the pressure guide 4 in the housing 1.

When the potting material 5 peels off the flange 44 of the pressure guide 4, water may penetrate the peeled part along the surface of the pressure guide 4 due to capillary action and reach the end face 4a of the flange 44. The end face 4a, however, is spaced apart from the wiring board 3, so that the water never reaches the board 3. Accordingly, the lead frame 14 embedded in the wiring board 3 is free from water and no migration is caused.

As explained above, the housing 1 accommodates the sensing element 2. The wiring board 3 is arranged in the opening 13 of the housing 1. The board 3 is made of resin and has a predetermined thickness. The diameter of the board 3 is slightly smaller than that of the opening 13. The lead frame 14 embedded in the board 3 has a predetermined shape. The board 3 has notches and holes at proper positions to expose the lead frame 14. The exposed spots are electrically connected to the output terminals 21 protruding from a metal case 23 of the sensing element 2 and the inner ends of the connector pins 12. One of the exposed spots is connected to a chip capacitor 24 with Ag paste.

The flange 44 of the pressure guide 4 is located below the wiring board 3 in the opening 13 of the housing 1. The periphery of the flange 44 is close to the inner wall of the opening 13, and the end face 4a of the flange 44 faces the board 3 with the clearance 61 between them.

The intake 22 extends from the metal case 23 of the sensing element 2 and passes through the wiring board 3. The intake 22 is airtightly connected to an upper opening of the pressure path 41 of the pressure guide 4 through an O-ring 43.

The potting material 5 fills spaces around the sensing element 2, the wiring board 3, and the flange 44 of the pressure guide 4 in the housing 1, to protect these components.

The potting material 5 and pressure guide 4 have different coefficients of thermal expansion, so that the potting material 5 may peel off the pressure guide 4 at part A for example, when an ambient temperature changes to cause thermal stress. Then, water may penetrate the part A. Due to capillary, the water will advance along the surface of the pressure guide 4 and reach the end face 4a of the flange 44. Even if this happens, the water on the end face 4a never reaches the wiring board 3 because the board 3 is separated away from the end face 4a by the potting material 5 filled in the clearance 61. Accordingly, no migration occurs at a junction of the chip capacitor 24.

The potting material 5 may also peel off the inner wall of the housing 1 at part B. Then, water may penetrate the part B. This water, however, is guided to the end face 4a through the periphery of the flange 44. The water, therefore, will not reach the wiring board 3.

The pressure guide 4 has a step 4b to thicken the outer wall of the pressure path 41 at the base thereof more than the outer diameter of a hose 6. The step 4b forms a corner C that may collect water drops at a gap between the hose 6 and the pressure sensor. Due to the corner C, water will not easily penetrate the parn A where the potting material 5 may peel off the pressure guide 4. This arrangement, therefore, improves the reliability of the pressure sensor.

If it is anticipated that no serious problem will occur even if the potting material 5 peels of the inner wall of the housing 1, the flange 44 of the pressure guide 4 may not have to be wide to reach the inner wall of the housing 1.

As explained above, the present invention simply separates the wiring board 3 incorporating the lead frame 14 away from the flange 44 of the pressure guide 4, so that, even if the potting material 5 peels off the housing 1 and pressure guide 4, water that may penetrate the peeled parts will not reach the wiring board 3 nor cause migration.

When the potting material 5 is injected in the housing 1 through the opening 13, air in the housing 1 and reactive gases produced by the potting material 5 escape from the housing 1 through the opening 13. At this moment, the flange 44 of the pressure guide 4 blocks the escaping gases. As a result, the gases remain particularly in the potting material 5 filled in the clearance 61 between the flange 44 and the wiring board 3.

These remaining gases deteriorate the sealing ability of the O-ring 43, or cause water to remain due to thermal stress. In addition, the gases increase the injection time of the potting material 5 and vary the injection quantity of the potting material 5 during manufacturing.

Figure 4:
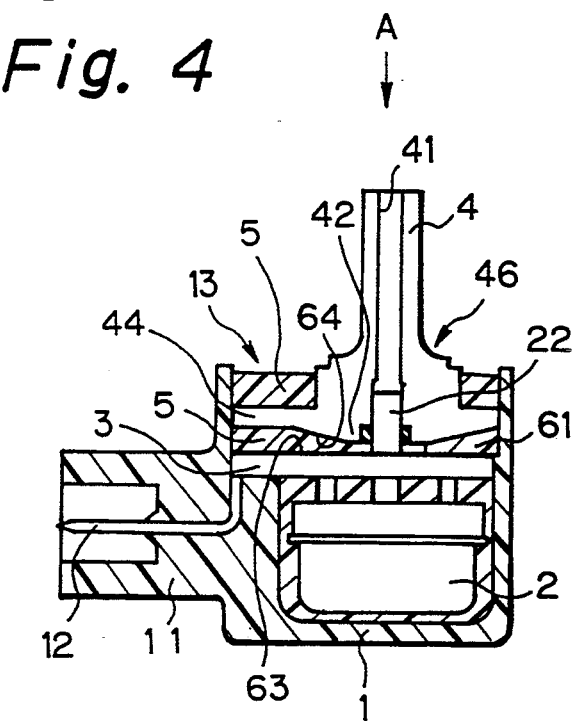
FIG. 4 is a section showing a pressure sensor according to another embodiment of the present invention.
Figure 5:
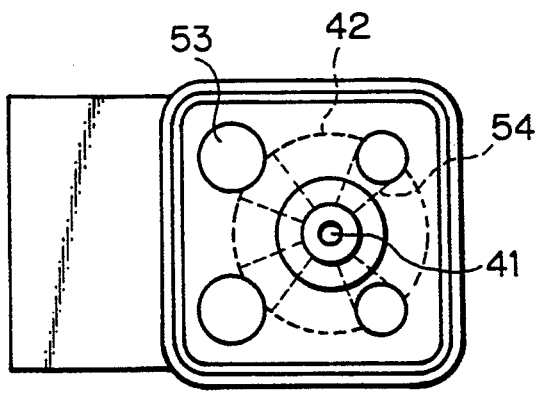
FIG. 5 is a plan view showing an end face of a pressure guide of the pressure sensor of FIG. 4.

Accordingly, a pressure sensor according to another embodiment of the present invention shown in FIGS. 4 and 5 leaves no gas inside when injecting potting material therein.

This pressure sensor has a housing 1 having an opening 13. The housing 1 accommodates a pressure sensing element 2 having a pressure intake 22. A pressure guide 4 has a pressure path 41 and a flange 44. The flange 44 is inserted in the opening 13 of the housing 1, and the pressure path 41 is airtightly connected to the intake 22 of the sensing element 2. The size of the flange 44 is substantially the same as that of the opening 13. Potting material 5 is injected in the housing 1.

Through holes 53 are formed on the periphery ot the flange 44 of the pressure guide 4. An end face of the flange 44 that faces the sensing element 2 is a tapered face 42. The tapered face 42 rises from the periphery thereof where the through holes 53 are formed toward the center thereof where an opening of the pressure path 41 engages with the intake 22 protruding from the sensing element 2. Namely, the tapered face 42 approaches the sensing element 2 as it rises from the periphery toward the center.

When the potting material 5 is injected in the housing 1 after the sensing element 2 and the flange 44 of the pressure guide 4 are set in the housing 1, air in spaces around the components in the housing 1 and reactive gases produced by the potting material 5 are guided along the tapered face 42 into the through holes 53, from which they are discharged outside.

In this way, this arrangement solves the problem of gases remaining in the housing 1 when injecting the potting material 5 in the housing 1.

Namely, this embodiment of the present invention is characterized in that one of the opposing end faces of the sensing element 2 and flange 44 is tapered, and that at least one through hole 53 is formed on the periphery of the flange 44.

The end face of the flange 44 of the pressure guide 4 may have grooves 54 that link the pressure path 41 with the through holes 53.

The housing 1 has a connector 11. The clearance 61 is defined between the sensing element 2 and the flange 44 of the pressure guide 4. A wiring board 3 is disposed in the clearance 61. The board 3 electrically connects output terminals of the sensing element 2 with connector pins of the connector 11.

Figure 6:
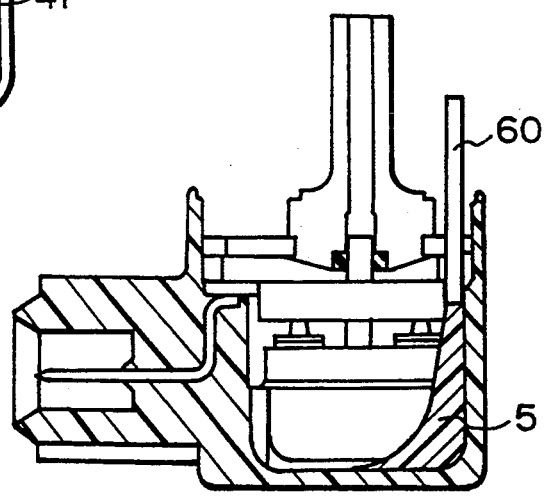
FIG. 6 explains an injection of potting material according to the present invention.
Figure 7:
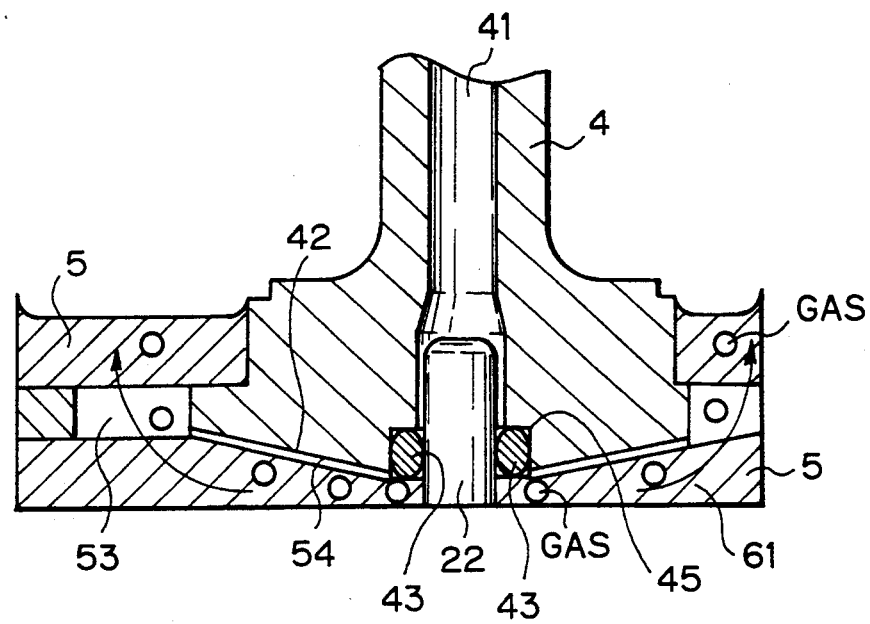
FIG. 7 explains a degassing effect according to the present invention.

When the potting material 5 is injected in the housing 1 as shown in FIG. 6, air in spaces around the components in the housing 1 and reactive gases produced by the potting material 5 smoothly move along the tapered face 42 toward the holes 53 and escape outside from the holes 53, as shown in FIG. 7.

Figure 8:
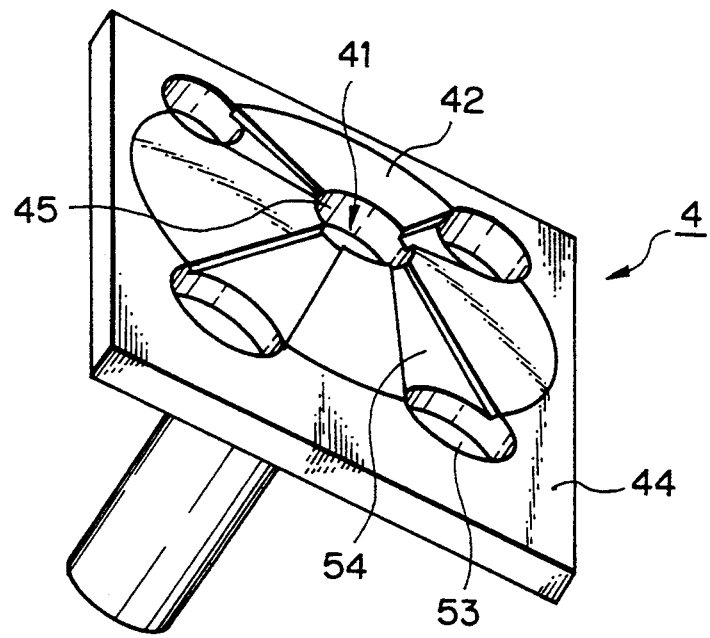
FIG. 8 is a perspective view showing the end face of the pressure guide of FIG. 5.

Referring to FIG. 8, the tapered face 42 of the pressure guide 4 extends from the peripheral through holes 53 up to a center recess 45 for receiving the O-ring 43. When the flange 44 of the pressure guide 4 is assembled in the housing 1 and the potting material 5 is injected in the housing 1, the tapered face 42 of the flange 44 is downwardly oriented as shown in FIG. 7. Accordingly, reactive gases produced by the potting material 5 in the clearance 61 are smoothly discharged from the housing 1 through the holes 53. At the same time, gases staying in the recess 45 for the O-ring 43 are guided along the grooves 54 on the tapered face 42 and are discharged outside through the holes 53.

Referring again to FIG. 4, the pressure guide 4 has a step 46 to thicken the diameter of the base of the pressure guide 4 more than that of a hose (not shown) connected to the pressure guide 4. The step 46 forms a corner that may collect water drops at a gap between the hose and the pressure sensor. Due to this corner, water will not easily penetrate a part where the potting material 5 may peel off the pressure guide 4.

Figure 9:
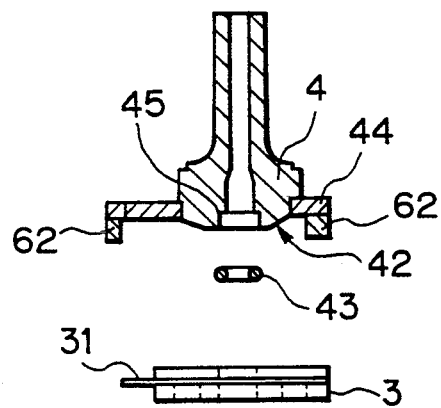
FIG. 9 explains an assembling of the pressure sensor according to the present invention.
Figure 9:
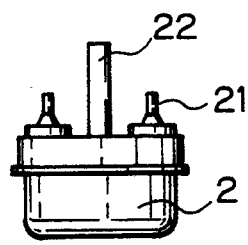
Figure 9:
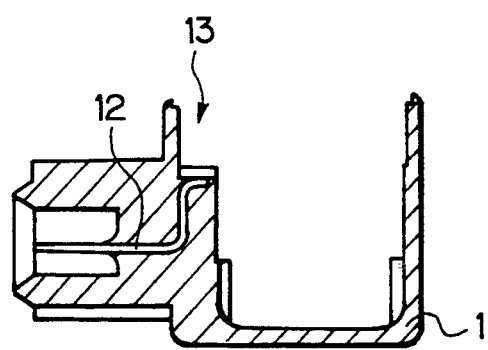

Assembling processes of the pressure sensor of the present invention of FIG. 4 will be explained with reference to FIG. 9.

The opening 13 of the housing 1 is oriented upwardly. The sensing element 2 and wiring board 3 are set in the housing 1. The lead pins 21 each extending from the metal case of the sensing element 2 through a through capacitor are caulked with the lead frame 31 embedded in the wiring board 3. The connector pins 12 of the housing 1 are caulked with the lead frame 31 too. The caulked parts are made electrically conductive by welding or soldering. The O-ring 43 is set in the recess 45 formed in the pressure guide 4. The pressure intake 22 protruding from the sensing element 2 is engaged with the pressure guide 4 through the O-ring 43. Spacers 62 may be provided for the flange 44 of the pressure guide 4. The flange 44 has the tapered face 42, degassing holes 53, and gas guiding grooves 54.

After assembling these components, an injection nozzle 60 is inserted in the housing 1 through one oi the degassing holes 53, as shown in FIG. 6, and the potting material 5 is injected and hardened. The injection is carried out under an atmospheric pressure or a negative pressure. In any case, the tapered face 42, degassing holes 53, and gas guiding grooves 54 provide the above-mentioned effects.

As explained above, the wiring board 3 and pressure guide 4 of the pressure sensor according to the present invention are separated from each other, so that air in the housing 1 and gases in the potting material 5 are easily degassed. As a result, a resin injection time for the pressure sensor of this embodiment is about 20% shorter than that for the pressure sensor of FIG. 2.

In the above embodiment, the wiring board 3 and pressure guide 4 are discrete parts. The present invention allows them to be integrated into a single structure, if the size of a flange of the structure to be inserted in the opening of the housing 1 is nearly equal to the size of the opening, and if the structure allows potting material to be injected therein after the structure is assembled in the housing.

To prevent the O-ring 43 from floating toward the sensing element 2 due to a high pressure passing through the pressure path 41, the O-ring 43 may be provided with a metal or resin sleeve and be fitted to the groove 45.

The tapered end face 42 of the flange 44 of the pressure guide 4 may have any shape, if the shape is proper for smoothly guiding gases along the face 42 toward the degassing holes 53 formed through the flange 44.

We claim:

1. A pressure sensor comprising:
   a housing having an opening;
   a pressure sensing element disposed in said housing and having a pressure intake;
   a pressure guide having a pressure path and a flange, the flange being fitted to said opening of said housing with an end of the pressure path being connected to said intake of said sensing element; and a wiring board interposed between said sensing element and said flange of said pressure guide,
wherein said pressure path of said pressure guide and said intake of said pressure sensing element are connected to each other and penetrate through said wiring board to form a pressure passage and a clearance is formed between said wiring board and said flange of said pressure guide, said clearance being filled with potting material and terminals of said pressure sensing element are provided on a side of said pressure sensing element where said intake is disposed.

2. A pressure sensor according to claim 1, wherein spacers are provided between said flange and said wiring board.

3. A pressure sensor according to claim 1, wherein a tapered portion is provided on a surface of said flange, said surface being disposed opposite to said wiring board, said tapered portion having a configuration such that a clearance of said tapered portion formed at a peripheral portion of said flange is relatively wider than that of said tapered portion formed at a central portion of said flange.

4. A pressure sensor according to claim 1, wherein an external diameter of said pressure path, formed on a surface of said flange, and opposite to a surface thereof facing to said wiring board and an opposite surface, is enlarged to form a curved portion at a root portion of said pressure path.

5. A pressure sensor according to claim 3, wherein an external diameter of said pressure path, formed on a surface of said flange, and opposite to a surface thereof facing to said wiring board and an opposite surface, is enlarged to form a curved portion at a root portion of said pressure path.

6. The pressure sensor according to claim 3, further comprising at least one through hole formed on the periphery of the flange of the pressure guide.

7. The pressure sensor according to claim 6, further comprising grooves formed on the flange of the pressure guide, to connect the through holes with the center of the flange.

8. A pressure sensor, comprising:
a housing having an opening;
a pressure sensing element disposed in the housing and having a pressure intake;
a pressure guide having a pressure path and a flange, the flange being fitted to the opening of the housing with an end of the pressure path being airtightly connected to the intake of the sensing element;
potting material injected in the housing;
through holes formed on the periphery of the flange of the pressure guide; and
a tapered end face of the flange of the pressure guide facing the sensing element, the tapered end face rising from the through holes toward the connection between the pressure path of the pressure guide and the intake of the sensing element, so that the tapered end face approaches the sensing element.

9. The pressure sensor according to claim 8, further comprising a connector provided for the housing and a wiring board disposed in a space between the sensing element and the pressure guide, the wiring board electrically connecting output terminals of the sensing element with connector pins of the connector.

10. The pressure sensor according to claim 8, further comprising grooves formed on the tapered face of the flange of the pressure guide, to link the center of the tapered face with the through holes.

11. A pressure sensor according to claim 8, wherein an external diameter of said pressure path, formed on a surface of said flange, and opposite to a surface thereof facing to said wiring board and an opposite surface, is enlarged to form a curved portion at a root portion of said pressure path.

12. A pressure sensor comprising:
a housing having an opening and a side wall, and embedding connector pins passing through the side wall;
a pressure sensing element disposed in the housing and having a pressure intake;
a wiring board inserted in the opening of the housing and having a lead frame for connecting given output terminals of the sensing element with ends of corresponding connector pins;
a pressure guide having a pressure path and a flange, the flange being fitted to the opening of the housing with an end face of the flange being spaced apart from the wiring board by a predetermined clearance with the pressure path being airtightly connected to the intake that extends from the sensing element through the wiring board; and
potting material that fills spaces around the sensing element, wiring board, and the flange of the pressure guide
wherein terminals of said pressure sensing elements provided on a side of said pressure sensing element where said intake is disposed.

13. A pressure sensor according to claim 12, wherein an external diameter of said pressure path, formed on a surface of said flange, and opposite to a surface thereof facing to said wiring board and an opposite surface, is enlarged to form a curved portion at a root portion of said pressure path.

14. A pressure sensor comprising:
a housing having an opening;
a pressure sensing element disposed in said housing and having a pressure intake;
a pressure guide having a tubular pressure path including a proximal end and a distal end, and a flange section, said flange section being disposed in a portion located inside said housing with respect to said opening; and
a wiring board interposed between said sensing element and said flange section of said pressure guide;
wherein said flange section is connected to said proximal end of said tubular pressure guide.

15. A pressure sensor according to claim 14, wherein a clearance is formed between said wiring board and said flange section of said pressure guide, said clearance being filled with potting material.

16. A pressure sensor according to claim 14, wherein said flange section is buried inside potting material.

* * * * *